(12) United States Patent
Zhu et al.

(10) Patent No.: US 9,154,998 B2
(45) Date of Patent: Oct. 6, 2015

(54) METHOD, SYSTEM, AND APPLICATION NETWORK ELEMENT FOR IMPROVING QUALITY OF SERVICE

(75) Inventors: Fenqin Zhu, Berlin (DE); Liping Yuan, Shanghai (CN); Junxing Cao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 561 days.

(21) Appl. No.: 13/333,835

(22) Filed: Dec. 21, 2011

(65) Prior Publication Data

US 2012/0087330 A1 Apr. 12, 2012

Related U.S. Application Data

(63) Continuation of application No. PCT/CN2010/074560, filed on Jun. 26, 2010.

(30) Foreign Application Priority Data

Jun. 26, 2009 (CN) .......................... 2009 1 0088365

(51) Int. Cl.
*H04W 28/24* (2009.01)
*H04W 28/16* (2009.01)
*H04W 28/18* (2009.01)
*H04L 29/06* (2006.01)
*H04W 72/04* (2009.01)

(52) U.S. Cl.
CPC ........... *H04W 28/24* (2013.01); *H04L 65/1016* (2013.01); *H04L 65/80* (2013.01); *H04W 28/16* (2013.01); *H04W 28/18* (2013.01); *H04W 72/0486* (2013.01)

(58) Field of Classification Search
None
See application file for complete search history.

(56) References Cited

U.S. PATENT DOCUMENTS

| | | | | |
|---|---|---|---|---|
| 6,687,221 | B1 * | 2/2004 | Kurose et al. | 370/230 |
| 7,023,825 | B1 * | 4/2006 | Haumont et al. | 370/338 |
| 2006/0007934 | A1 | 1/2006 | Chemiakina et al. | |

(Continued)

FOREIGN PATENT DOCUMENTS

| | | |
|---|---|---|
| CN | 1437339 A | 8/2003 |
| CN | 1747359 A | 3/2006 |

(Continued)

OTHER PUBLICATIONS

International Search Report dated Sep. 30, 2010 in connection with International Patent Application No. PCT/CN2010/074560.

(Continued)

*Primary Examiner* — Christopher Crutchfield

(57) ABSTRACT

When a resource of an access network is changed, receiving, by an application network, resource information sent by the access network, where the resource information is information that indicates a current resource status of the access network; and adjusting, by the application network, a service request related to a current service according to the resource information and sending the adjusted service request to the access network; or negotiating, by the application network, a current service parameter with a User Equipment UE according to the resource information, so that the UE modifies the parameter related to the current service according to a result of the negotiation. In the embodiments of the present invention the service parameter or the service request related to the current service matches the changed access network resource, thereby improving the QoS.

15 Claims, 10 Drawing Sheets

(56) References Cited

U.S. PATENT DOCUMENTS

| | | |
|---|---|---|
| 2006/0253888 A1 | 11/2006 | Senga et al. |
| 2007/0115796 A1* | 5/2007 | Jeong et al. ............... 370/203 |
| 2007/0248028 A1 | 10/2007 | Choe et al. |
| 2008/0273520 A1 | 11/2008 | Kim et al. |
| 2009/0225705 A1* | 9/2009 | Kwon et al. ............... 370/329 |
| 2009/0252124 A1* | 10/2009 | Yeo et al. .................. 370/336 |
| 2010/0115071 A1 | 5/2010 | Sanchez Santiso et al. |
| 2010/0235620 A1 | 9/2010 | Nylander et al. |

FOREIGN PATENT DOCUMENTS

| | | |
|---|---|---|
| CN | 101127629 A | 2/2008 |
| CN | 101448239 A | 6/2009 |
| JP | 2004-266330 | 9/2004 |
| JP | 2006503493 A | 1/2006 |
| JP | 2010508738 A | 3/2010 |
| JP | 2011504665 A | 2/2011 |
| WO | WO 2004/036845 A1 | 4/2004 |
| WO | WO 2008/055541 A1 | 5/2008 |
| WO | WO 2009/019671 A1 | 2/2009 |
| WO | WO 2009/049684 A1 | 4/2009 |
| WO | WO 2009/051528 A1 | 4/2009 |

OTHER PUBLICATIONS

Written Opinion of the International Searching Authority dated Sep. 30, 2010 in connection with International Patent Application No. PCT/CN2010/074560.

Notice of Reasons for Rejection dated May 28, 2013 in connection with Japanese Patent Application No. 2012-516502.

Supplementary European Search Report dated Jul. 31, 2012 in connection with European Patent Application No. EP 10 79 1590.

Translation of Office Action dated Jul. 3, 2012 in connection with Chinese Patent Application No. 200910088365.3.

Partial translation of Office Action dated Jan. 15, 2013 in connection with Chinese Patent Application No. 200910088365.3.

* cited by examiner

METHOD, SYSTEM, AND APPLICATION NETWORK ELEMENT FOR IMPROVING QUALITY OF SERVICE

CROSS-REFERENCE TO RELATED APPLICATIONS

This application is a continuation of International Application No. PCT/CN2010/074560, filed on Jun. 26, 2010, which claims priority to Chinese Patent Application No. 200910088365.3, filed on Jun. 26, 2009, all of which are hereby incorporated by reference in their entireties.

TECHNICAL FIELD

The present invention relates to communications technologies, and in particular, to a method, a system, and an application network element for improving Quality of Service.

BACKGROUND

In a communication network, an access network is configured to transmit service data of a User Equipment (abbreviated as UE) and an application network is configured to control the processing of the service data, that is, to provide services to the UE.

In the prior art, steps for allocating resources to the access network include: A UE obtains an IP address by creating a default bearer and sets up a Public Data Network (abbreviated as PDN) connection; the UE negotiates a resource required by a service, such as Quality of Service (abbreviated as QoS), codec, etc. with the application network; the application network forms a service request and sends the service request to a Policy Charging and Rules Function (abbreviated as PCRF) entity, and the PCRF entity creates Policy Charging Control (abbreviated as PCC) rules according to the service request, the PCRF entity delivers the PCC rules to a Packet Data Network Gateway (abbreviated as P-GW); the P-GW, according to the PCC rules, sets up a dedicated service bearer required by the service; and the UE exchanges service data with a remote end (such as another UE) through the set up dedicated service bearer.

The method for setting up a service bearer in the prior art has the following problem. Through the above steps, the bearer for the UE to exchange service data is set up, during the process that the UE exchanges service data, if a resource of the access network is changed, for example, the access network is congested, the previously set up service bearer does not match the changed access network resource and the previously formed service request does not match the changed access network resource either; as a result, the QoS of the service deteriorates and the service is even caused to be interrupted.

SUMMARY

In view of the problems existing in the prior art, embodiments of the present invention provide a method, a system, and an application network element for improving QoS, so that a service parameter or a service request related to a current service matches a changed access network resource, thereby improving the QoS.

An embodiment of the present invention provides a method for improving QoS, including:

when a resource of an access network is changed, receiving, by an application network, resource information sent by the access network, where the resource information is information that indicates a current resource status of the access network; and adjusting, by the application network, a service request related to a current service according to the resource information and sending the adjusted service request to the access network; or negotiating, by the application network, a service parameter related to the current service with a UE according to the resource information, so that the UE modifies the service parameter related to the current service according to a result of the negotiation.

An embodiment of the present invention provides a system for improving QoS, including:

an access network, configured to send resource information when a resource of the access network is changed, where the resource information is information that indicates a current resource status of the access network; and an application network, configured to receive the resource information, adjust a service request related to a current service according to the resource information, and send the adjusted service request to the access network; or negotiate a service parameter related to the current service with a UE according to the resource information, so that the UE modifies the service parameter related to the current service according to a result of the negotiation.

An embodiment of the present invention further provides an application network element, including:

a receiving unit, configured to receive resource information sent by an access network, where the resource information is information that indicates a current resource status of the access network; and a processing unit, connecting with the receiving unit, configured to adjust a service request related to a current service according to the resource information received by the receiving unit and send the adjusted service request to the access network; or configured to negotiate a service parameter related to the current service with a UE according to the resource information received by the receiving unit, so that the UE modifies the service parameter related to the current service according to a result of the negotiation.

DETAILED DESCRIPTION

Figure 1:
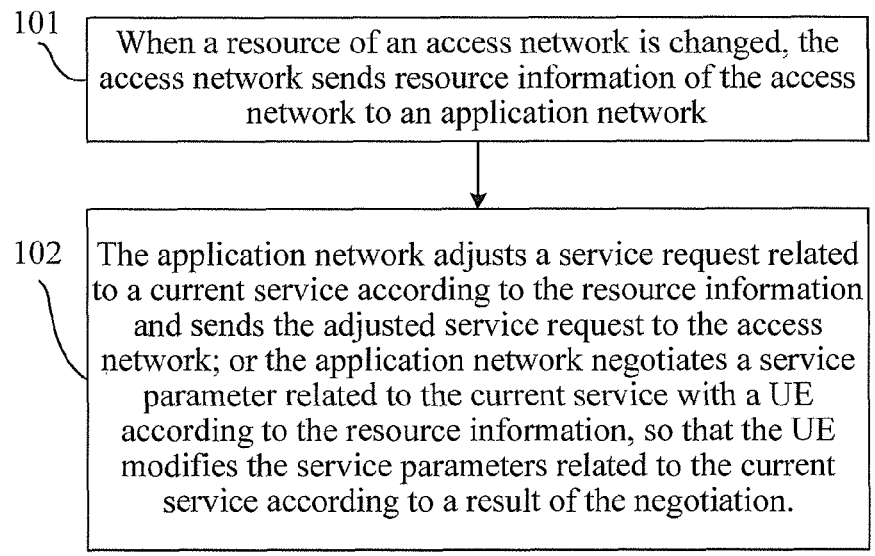
FIG. 1 is a flow chart of a method for improving QoS according to a first embodiment of the present invention.

FIG. 1 is a flow chart of a method for improving QoS according to the first embodiment of the present invention, and includes:

Step 101: When a resource of an access network is changed, an application network receives resource information sent by the access network, where the resource information is information that indicates a current resource status of the access network.

Step 102: The application network adjusts a service request related to a current service according to the resource information and sends the adjusted service request to the access network; or the application network negotiates a service parameter related to the current service with a UE according to the resource information, so that the UE modifies the service parameter related to the current service according to a result of the negotiation.

In step 102, the adjusting, by the application network, the service request related to the current service according to the resource information may include: negotiating, by the application network, a service parameter related to the current service with the UE according to the resource information and adjusting the service request related to the current service.

After step 102, the access network may modify a current service bearer according to the adjusted service request, or re-set up a service bearer.

In the embodiments of the present invention, the service request is a requirement for various parameters related to the current service, for example, at least one of type of codec, bearer requirement, and access network parameter requirement related to the current service.

The resource information is information that indicates the current resource status of the access network. The resource information may be at least one of congestion indication, number of users, CPU usage, remaining bandwidth, acceptable codec, supportable service request (such as QoS Class Identifier (abbreviated as QCI)), and suggestion of a new bandwidth. The expression of the resource information may be a specific number or a specific identifier. For example, one identifier may be used to indicate that currently the access network is in congestion, and a specific number may be used to indicate current CPU usage of the access network.

According to the method provided in the embodiment of the present invention, when the resource of the access network is changed, the access network sends the resource information of the access network to the application network; and the application network adjusts the service request related to the current service according to the resource information and sends the adjusted service request to the access network, or the application network negotiates the current service parameter with the UE according to the resource information, so that the UE modifies the parameter related to the current service according to the result of the negotiation. In this way, the service parameter or the service request related to the current service matches the changed access network resource and the QoS is improved.

Figure 2:
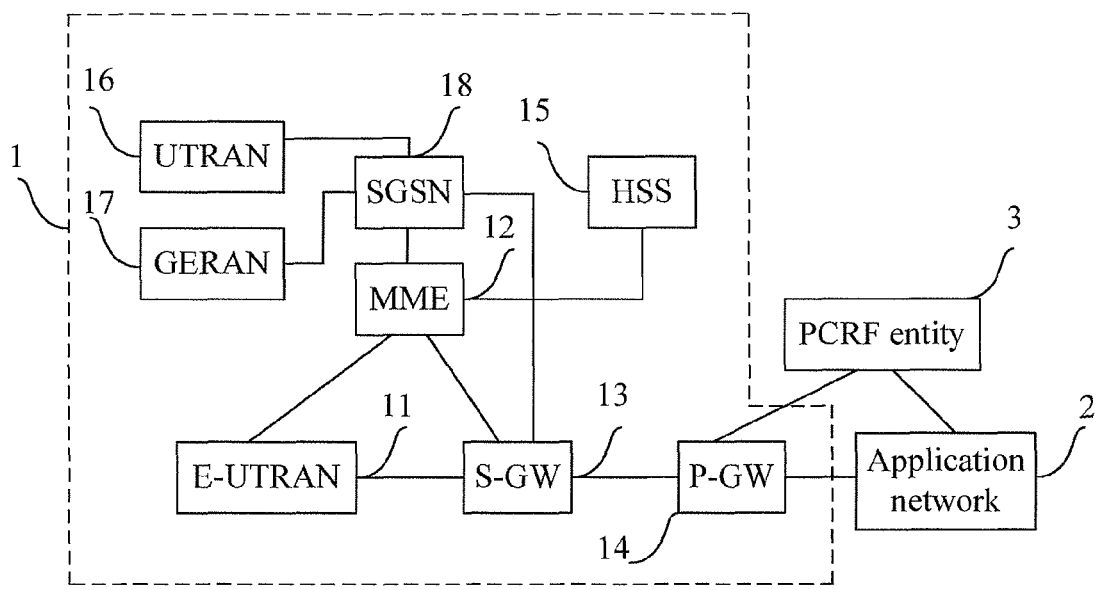
FIG. 2 is a schematic structure diagram of an EPS involved in an embodiment of the present invention.

There are multiple types of networks that can implement the function of an access network and there are also multiple types of networks that can implement the function of an application network. FIG. 2 is a schematic structure diagram of an Evolved Packet System (abbreviated as EPS) involved in an embodiment of the present invention. The system includes an access network 1, a PCRF entity 3 and an application network 2. The access network 1 includes an Evolved UMTS Terrestrial Radio Access Network (abbreviated as E-UTRAN) 11, a Mobility Management Entity (abbreviated as MME) 12, a Serving Gateway (abbreviated as S-GW) 13, a Packet Data Network Gateway (abbreviated as P-GW) 14, a Home Subscriber Server (abbreviated as HSS) 15, a UMTS Terrestrial Radio Access Network (abbreviated as UTRAN) 16, a GSM/EDGE Radio Access Network (abbreviated as GERAN) 17, and a Service GPRS Support Node (abbreviated as SGSN) 18.

The E-UTRAN 11, UTRAN 16, and GERAN 17 can implement all radio related functions. The E-UTRAN 11 may include an evolved NodeB (abbreviated as eNB), or include a Home eNB and a Home eNodeB Gateway. The eNB may communicate with the UE.

The MME 12 and the SGSN 18 are responsible for the mobility management of a control plane, including management of user context and mobility state, and allocating temporary user identification.

The S-GW 13 is a user plane anchor point between different access networks in the 3GPP, and an interface for screening different access networks in the 3GPP.

The P-GW 14 is a user plane anchor point between a 3GPP access network and a non access network, and an interface with an external Packet Data Network.

The HSS 15 stores subscription information of users.

The application network provides services and applications to a user. In FIG. 2, the application network may be an IP Multimedia Subsystem (abbreviated as IMS). The IMS is a network that can implement packet voice and packet data and can provide uniform multimedia services and applications. The IMS uses an IP packet domain as a bearer channel for control signaling and medium transmission. The control signaling is call control signaling based on the Session Initiation Protocol (abbreviated as SIP).

To solve QoS and flow based charging problems, PCC architecture may enable a network to detect different service flows and implement QoS control and charging accounting for the service flows.

The PCC architecture mainly includes a PCRF entity, a Policy and Charging Enforcement Function (abbreviated as PCEF) entity, a Subscription Profile Repository (abbreviated as SPR), an Application Function (abbreviated as AF) entity, an Offline Charging System (abbreviated as OCS), and an Online Charging System (abbreviated as OCS).

The PCRF entity decides corresponding PCC rules according to restrictions of an access network, operator's policy, subscription profile, and information of an ongoing service of a user (obtained from the AF entity), and provides the PCC rules to the PCEF entity. PCEF entity enforces the PCC rules. The PCC rules include a rule for detecting a service data flow (such as, an IP flow set of voice), whether to gate, QoS corresponding to the service data flow, and flow based charging rule.

The PCEF entity enforces the PCC rules delivered or designated by the PCRF entity. Specifically, the PCEF entity executes the detection and measurement of the service data flow, guarantees the QoS of the service data flow, processes traffic of user plane, and triggers session management of control plane. The PCRF entity dynamically generates or modifies the corresponding PCC rules according to the session information of the application layer of the AF entity. The PCEF entity may be located in a gateway.

In addition to sending the PCC rules to the PCEF entity, the PCRF entity may further request the PCEF entity to detect certain events, for example, an IP-CAN bearer loses or restores a connection and a gateway is in fault. When having detected the occurrence of a corresponding event, the PCEF entity reports the event to the PCRF entity, and the PCRF entity re-determines the PCC rules according to the reported event.

In a network structure shown in FIG. 2, the P-GW implements the functions of the PCEF entity and a Proxy-Call Session Control Function (abbreviated as P-CSCF) entity in the IMS implements the functions of the AF. The P-GW, the PCRF entity, and the P-CSCF form the PCC architecture.

A specific implementation process of the embodiment of the present invention is described below with reference to the network structure shown in FIG. 2.

In step 101, an eNB in the access network may send the resource information to the P-CSCF entity in the IMS. Specifically, the eNB sends the resource information to a UE and the UE sends a message that carries the resource information to the P-CSCF in the IMS.

Figure 3:
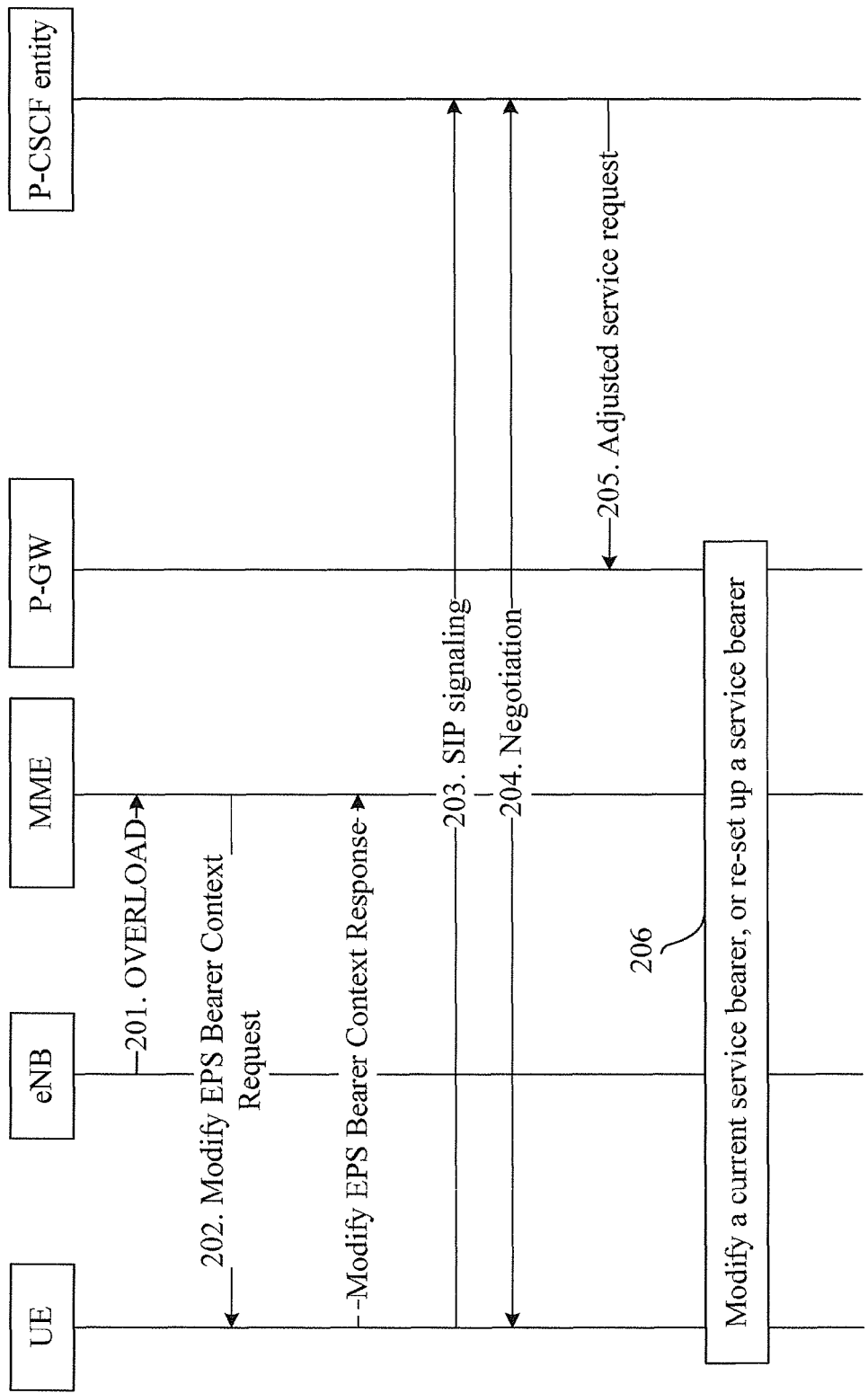
FIG. 3 is a signaling interaction diagram of a method for improving QoS according to a second embodiment of the present invention.

FIG. 3 is a signaling interaction diagram of a method for improving QoS according to a second embodiment of the present invention and includes Step 201: When a resource of an access network is changed, an eNB sends a S1-AP message that carries resource information to an MME, for example, the eNB sends an overload message OVERLOAD to the MME.

Step 202: After receiving the OVERLOAD sent by the eNB, the MME sends a message that carries the resource information to a UE, for example, sends a Modify EPS Bearer Context Request to the UE. After receiving the OVERLOAD sent by eNB, the MME obtains the resource information and according to the content of the resource information, for example, the resource information is supportable QCI, the MME may choose all bearers set up on the eNB or choose a bearer with a QCI other than the supportable QCI in the resource information, and send a message carrying the resource information and related to a specific bearer to the UE. Alternatively, the MME may choose a bearer guaranteeing Guaranteed Bit Rate (Guaranteed Bit Rate). The Modify EPS Bearer Context Request sent by the MME to the UE is a modification request specific to the GBR bearer. The choosing of the specific bearer can accurately reflect an affected bearer and reduce interaction of control signaling in the network.

After finishing step 202, the UE may send to the eNB a Modify EPS Bearer Context Response.

Step 203: After receiving the Modify EPS Bearer Context Request, the UE obtains the resource information, and sends a message that carries the resource information to a P-CSCF entity in an IMS; for example, the UE sends SIP signaling to the P-CSCF.

Step 204: The P-CSCF entity negotiates a service parameter related to a current service with the UE according to the resource information in the received message, so that the UE can modify the parameter related to the current service according to a result of the negotiation. For example, the current service is a video service and when the access network resource is in congestion, the P-CSCF entity may negotiate the encoding scheme with the UE and choose an encoding scheme supported by UE and being able to effectively relieve the current congestion state of the access network. The UE may modify the encoding scheme according to a result of the negotiation.

Step 205: The P-CSCF entity adjusts a service request related to the current service according to the resource information in the received message, for example, adjusts a bandwidth requirement and an encoding requirement related to the current service, and sends the adjusted service request to a P-GW in the access network.

Step 206: The P-GW modifies a current service bearer according to the adjusted service request, or re-set up a service bearer.

In the second embodiment, after step 204 is performed, steps 205 and 206 may not be performed. Through step 204 in which the P-CSCF entity negotiates with the UE, the UE can modify the parameter related to the current service to match the changed resource of the access network, so as to improve the QoS.

In the second embodiment, after step 203 is performed, step 204 may not be performed, but steps 205 and 206 are performed sequentially, in which the P-CSCF entity adjusts the service request according to the resource information, so that the access network can modify the current service bearer according to the adjusted service request or re-set up a service bearer, thereby improving the QoS.

In the second embodiment, after step 203 is performed, steps 204, 205, and 206 may be performed sequentially, so that the access network can modify the current service bearer according to the adjusted service requestor re-set up a service bearer, thereby improving the QoS.

In the second embodiment, in step 202, the MME may not choose a bearer and instead, the step to choose the bearer is performed by eNB. Specifically, in step 201, the eNB chooses a specific bearer and sends the resource information carried in a message related to the specific bearer to the MME. Then, steps 202-206 are performed. The choosing of the specific bearer can accurately reflect the affected bearer and reduce the interaction of the control signaling in the network.

Figure 4:
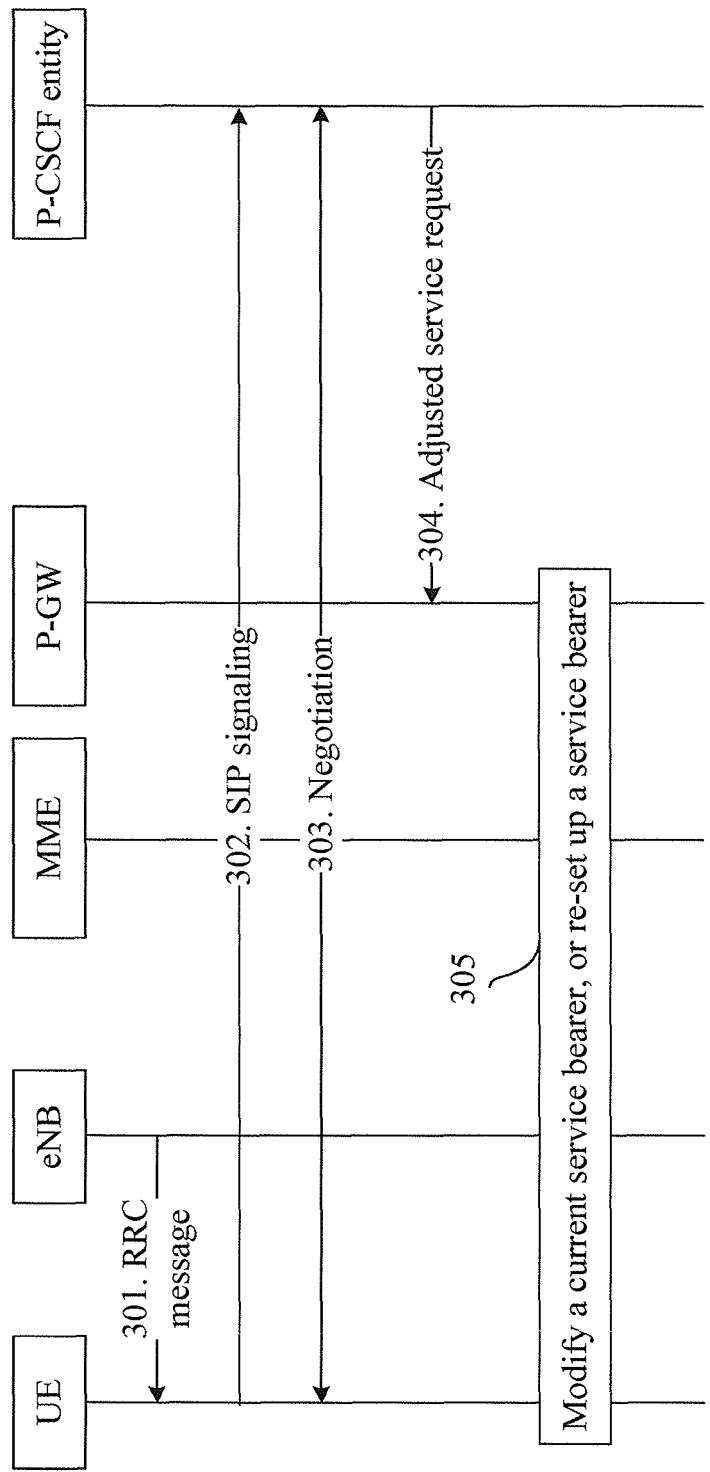
FIG. 4 is a signaling interaction diagram of a method for improving QoS according to a third embodiment of the present invention.

FIG. 4 is a signaling interaction diagram of a method for improving QoS according to a third embodiment of the present invention and includes:

Step 301: An eNB sends an RRC message that carries resource information to a UE, where the RRC message may be a Radio Bearer Setup message.

Steps 302-305 are the same as steps 203-206.

In the embodiment shown in FIG. 1, in step 101, the eNB in the access network may send the resource information to the PCRF entity and then the PCRF entity sends the resource information to the P-CSCF entity in the IMS. The sending, by the eNB, the resource information to the PCRF entity may be that the eNB sends a message that carries the resource information to the MME; the MME sends the resource information to the P-GW; and the P-GW sends an IP-CAN message that carries the resource information to the PCRF entity.

The sending, by the P-GW, the IP-CAN message that carries the resource information to the PCRF entity may be that the P-GW sends an IP-CAN Session Modification message or an IP-CAN Session Notification message that carries the resource information. In embodiments below, description is made with the IP-CAN Session Modification message as an example.

The MME may send the resource information to the P-GW in the following ways. (1) The MME sends a message that carries the resource information to the S-GW and the S-GW sends a message that carries the resource information to the P-GW; (2) the MME sends a message that carries the resource information to the UE, the UE sends a Request Bearer Resource Modification message that carries the resource information to the MME, the MME sends a Request Bearer Resource Modification message that carries the resource information to the S-GW, and the S-GW sends a Request Bearer Resource Modification message that carries the resource information to the P-GW; and (3) the MME encapsulates the resource information in a GTP-C header and sends the GTP-C header to the S-GW through a bearer modification process, and the S-GW sends the GTP-C header to the P-GW.

(1) The MME sends a message that carries the resource information to the S-GW and the S-GW sends a message that carries the resource information to the P-GW.

Figure 5:
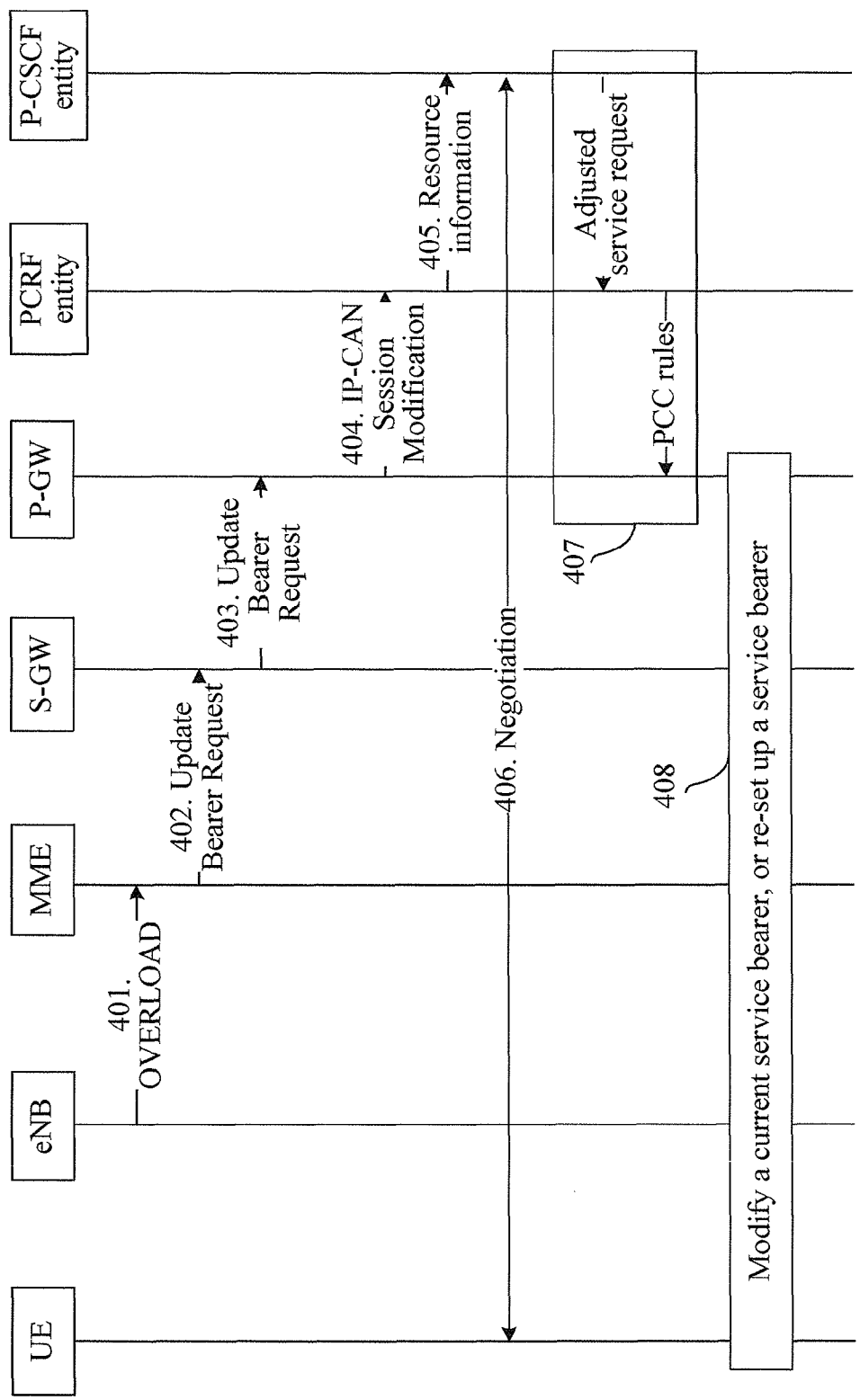
FIG. 5 is a signaling interaction diagram of a method for improving QoS according to a fourth embodiment of the present invention.

FIG. 5 is a signaling interaction diagram of a method for improving QoS according to a fourth embodiment of the present invention and includes:

Step 401: An eNB sends an OVERLOAD that carries resource information to an MME. Specifically, the eNB may choose a specific bearer and send an OVERLOAD carrying the resource information and related to the specific bearer to the MME.

Step 402: The MME sends a message that carries the resource information to an S-GW. For example, the MME sends an Update Bearer Request to the S-GW. In step 401, the eNB may not choose a specific bearer and instead the specific bearer is chosen by the MME. Specifically, the MME may choose a specific bearer and send an Update Bearer Request carrying the resource information and related to the specific bearer to the S-GW.

Step 403: The S-GW sends a Update Bearer Request that carries the resource information to a P-GW.

Step 404: After receiving the Update Bearer Request, the P-GW sends an IP-CAN Session Modification message that carries the resource information to a PCRF entity. Optionally, after receiving the Update Bearer Request, the P-GW may make a judgment about the resource information therein to determine whether being repeated resource information, and in the case of repeated resource information, the P-GW may not send to the PCRF entity; in the case of not being repeated resource information, the P-GW sends the resource information to the PCRF entity through an IP-CAN Session Modification message. Alternatively, after receiving the Update Bearer Request, the P-GW may determine, according to the priority of the resource information therein, whether the resource information needs to be sent to the PCRF entity. For example, according to the requirement of a Guaranteed Bit Rate, the priority of resource information that can well guarantee the bit rate is set to be low and the priority of resource information that cannot well guarantee the bit rate is set to be high. With regard to resource information of a low priority, the P-GW may not send the resource information to the PCRF entity; with regard to resource information of a high priority, the P-GW may send the resource information to the PCRF. Alternatively, ofter receiving the Update Bearer Request, the P-GW may determine whether the resource information therein matches current PCC rules; in case of being match, the resource information is discarded, in case of not being match, the resource information is sent to the PCRF entity.

Step 405: The PCRF entity selects a part of the resource information (for example, information related to codec or bandwidth) and sends the selected resource information to a P-CSCF entity; for example, the PCRF encapsulates the selected resource information in an information element defined by the Diameter protocol and sends the information element defined by the Diameter protocol to the P-CSCF entity.

Step 406: The P-CSCF entity negotiates with a UE over a service parameter related to a current service according to the resource information in the received message. For example, the current service is a video service and when an access network resource is in congestion, the P-CSCF entity may negotiate an encoding scheme with the UE and choose the encoding scheme supported by the UE and being able to effectively relieve the current congestion state of the access network.

Step 407: The P-CSCF entity adjusts a service request related to the current service according to the resource information in the received message. For example, the P-CSCF entity adjusts a bandwidth requirement and an encoding requirement related to the current service and sends the adjusted service request to the P-GW in the access network. Specifically, the adjusted service request may be sent to the PCRF entity through an information element defined by the Diameter protocol and the PCRF entity generates PCC rules according to the adjusted service request and sends the PCC rules to the P-GW.

Step 408: The P-GW modifies a current service bearer according to the adjusted service request, or re-sets up a service bearer.

In the fourth embodiment, after step 406 is performed, steps 407 and 408 may not be performed. Through step 406 in which the P-CSCF entity negotiates with the UE, the UE can modify the parameter related to the current service to match the changed resource of the access network, so as to improve the QoS.

In the fourth embodiment, after step 405 is performed, step 406 may not be performed, but steps 407 and 408 are performed sequentially, in which the P-CSCF entity adjusts the service request according to the resource information, so that the access network can modify the current service bearer according to the adjusted service request or re-set up a service bearer, thereby improving the QoS.

In the fourth embodiment, after step 405 is performed, steps 406, 407, and 408 may be performed sequentially so that the access network can modify the current service bearer according to the adjusted service request or re-set up a service bearer, thereby improving the QoS.

In the embodiment shown in FIG. 5, the eNB sends the resource information to the PCRF entity through steps 401-404. In steps 403 and 404, the resource information can not only be carried in the Update Bearer Request, but also be carried in other messages. For example, types of messages of GPRS tunneling protocol for control plane (abbreviated as GTP-C) may be added, and the resource information is carried in the added messages. Table 1 shows types of GTP-C messages involved in the embodiment of the present invention.

TABLE 1

Types of GTP-C messages involved in the embodiment of the present invention

| Message Type Value (Decimal) | Message | Reference | GTP-C | GTP-U |
|---|---|---|---|---|
| 0 | Reserved |  |  |  |
|  | PGW to MME, MME to PGW, SGW to PGW, SGW to MME (S5/S8, S11) |  |  |  |
| 101 | Delete PDN Connection Set Request |  | X |  |
| 102 | Delete PDN Connection Set Response |  | X |  |
| 103 to 127 | For future use |  |  |  |
|  | MME to SGW (S11) |  |  |  |

TABLE 1-continued

Types of GTP-C messages involved in the embodiment of the present invention

| Message Type Value (Decimal) | Message | Reference | GTP-C | GTP-U |
|---|---|---|---|---|
| 160 | Create Forwarding Tunnel Request | | X | |
| 161 | Create Forwarding Tunnel Response | | X | |
| 162 | Suspend Notification | | X | |
| 163 | Suspend Acknowledge | | X | |
| 164 | Resume Notification | | X | |
| 165 | Resume Acknowledge | | X | |
| 166 | Create Indirect Data Forwarding Tunnel Request | | X | |
| 167 | Create Indirect Data Forwarding Tunnel Response | | X | |
| 168 | Delete Indirect Data Forwarding Tunnel Request | | X | |
| 169 | Delete Indirect Data Forwarding Tunnel Response | | X | |
| 170 | Release Access Bearers Request | | X | |
| 171 | Release Access Bearers Response | | X | |
| 172 to 175 | For future use | | | |

In Table 1, a new type of message sent from the MME to the SGW which can carry the resource information may be added between message type values 172-175. For example a new OVERLOAD may be added. A new type of message sent from the SGW to the PGW which can carry the resource information may be added between message type values 103-127.

(2) The MME sends a message that carries the resource information to the UE, the UE sends a Request Bearer Resource Modification message that carries the resource information to the MME, the MME sends a Request Bearer Resource Modification message that carries to the S-GW, and the S-GW sends a Request Bearer Resource Modification message that carries to the P-GW.

Figure 6:
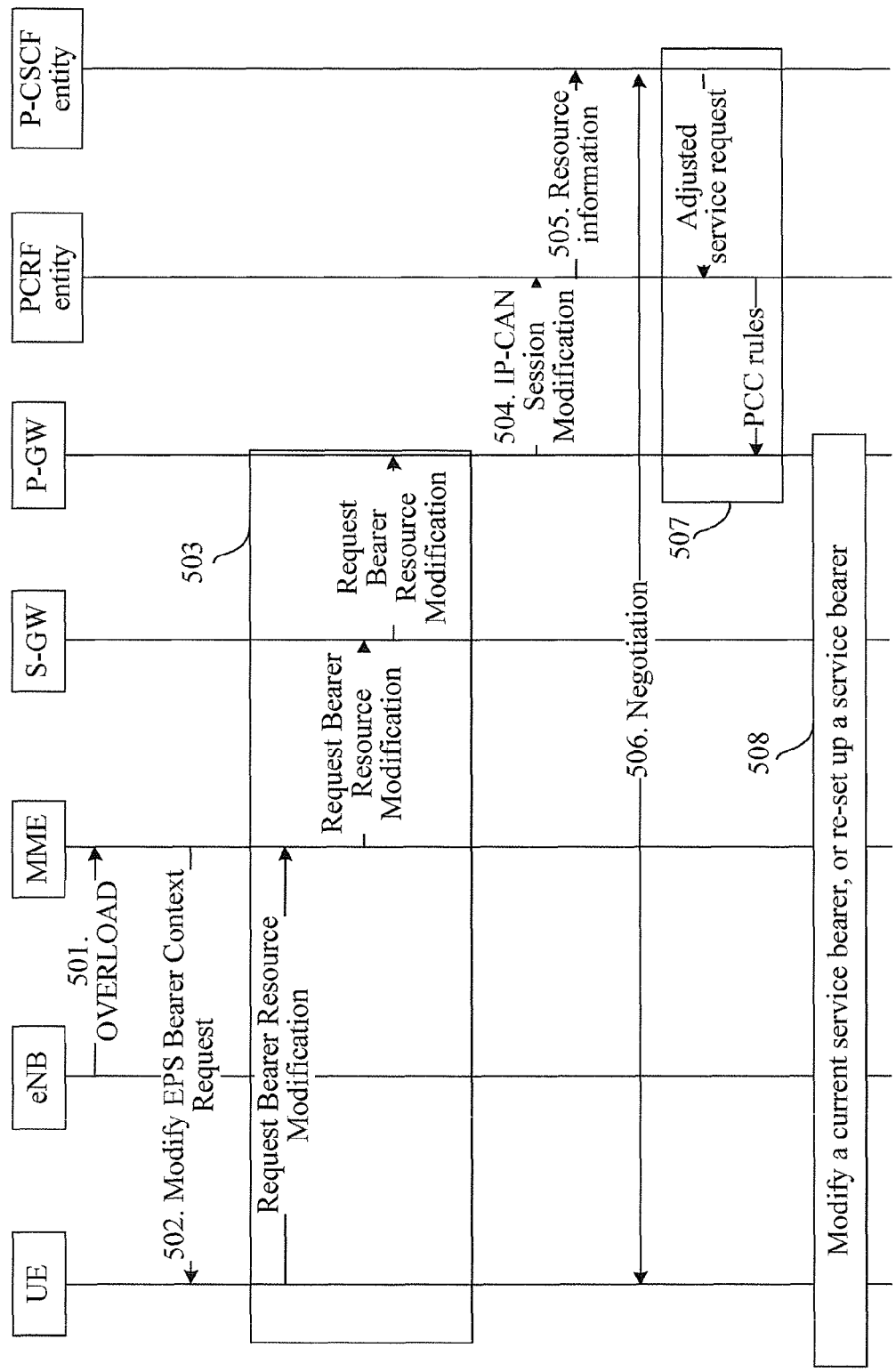
FIG. 6 is a signaling interaction diagram of a method for improving QoS according to a fifth embodiment of the present invention.

FIG. 6 is a signaling interaction diagram of a method for improving QoS according to a fifth embodiment of the present invention, and includes:

Step 501: An eNB sends an OVERLOAD that carries resource information to an MME. Specifically, the eNB may choose a specific bearer, and send an OVERLOAD related to the specific bearer and carrying the resource information to the MME.

Step 502: After receiving the OVERLOAD sent by the eNB, the MME sends a message that carries the resource information to a UE; for example, a Modify EPS Bearer Context Request is sent to the UE.

Step 503: The UE sends a Request Bearer Resource Modification message that carries the resource information to the MME, the MME sends a Request Bearer Resource Modification message that carries the resource information to an S-GW, and the S-GW sends a Request Bearer Resource Modification message that carries the resource information to a P-GW.

The implementation processes of Steps 504-508 are the same as those of steps 404-408.

(3) The MME encapsulates the resource information in a GTP-C header and sends the GTP-C header to the S-GW through a bearer modification process, and the S-GW sends the GTP-C header to the P-GW.

A GTP-C header is included in the header of each data packet. Each data packet transmitted between the MME, the S-GW, and the P-GW carries the GTP-C header. The sending the GTP-C header to the S-GW through the bearer modification process includes: sending the GTP-C header that carries the resource information to the S-GW through a signaling message transmitted between the MME and the S-GW in the bearer modification process, where the signaling message is a type of data packet, and sending the GTP-C header that carries the resource information to the P-GW through a signaling message transmitted between the S-GW and the P-GW in the bearer modification process.

Figure 7:
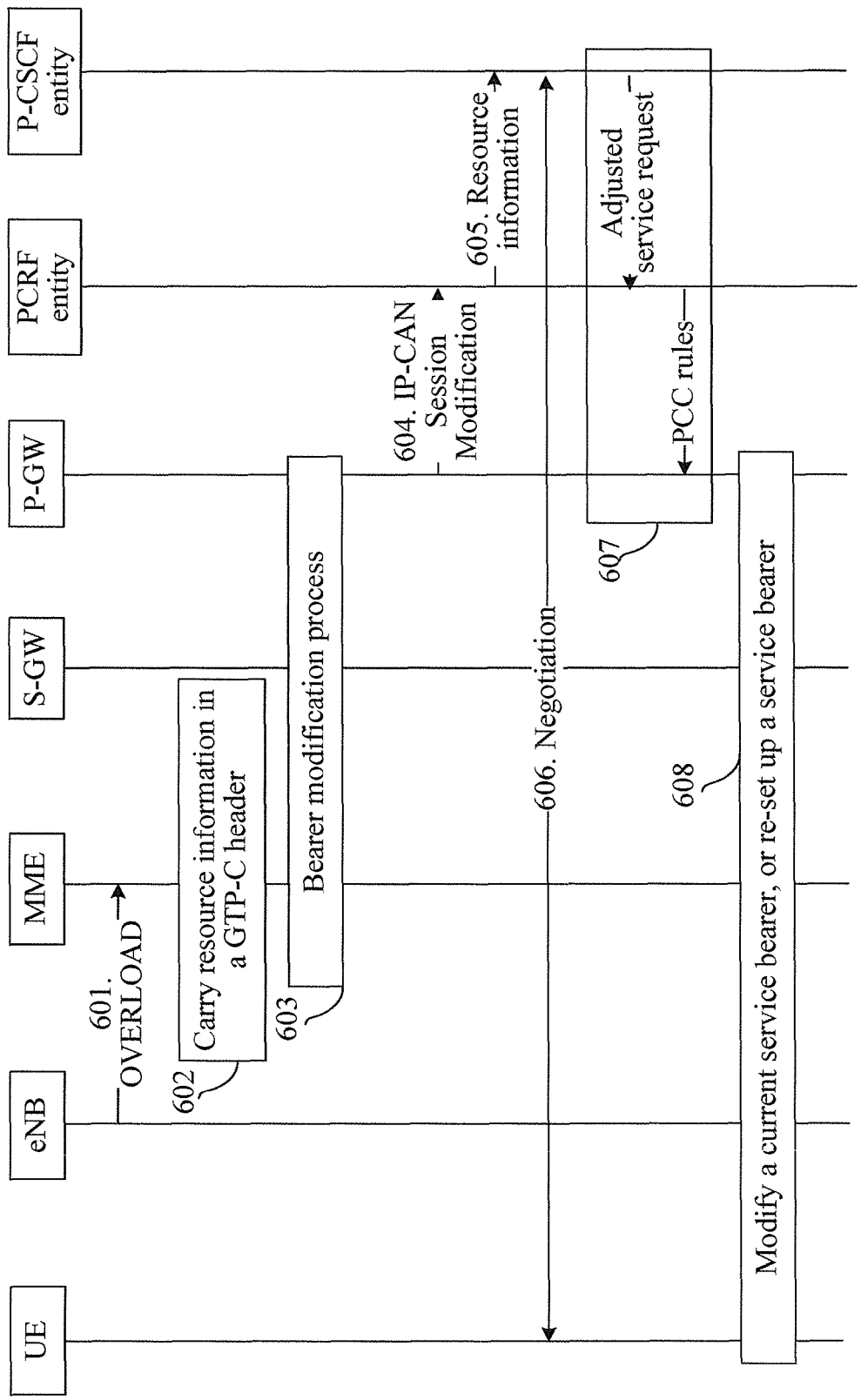
FIG. 7 is a signaling interaction diagram of a method for improving QoS according to a sixth embodiment of the present invention.

FIG. 7 is a signaling interaction diagram of a method for improving QoS according to a sixth embodiment of the present invention, and includes:

Step 601: An eNB sends an OVERLOAD that carries resource information to an MME. Specifically, the eNB may choose a specific bearer and send an OVERLOAD carrying the resource information and related to the specific bearer to the MME.

Step 602: After receiving the OVERLOAD sent by the eNB, the MME encapsulates the resource information in a GTP-C header.

Step 603: The GTP-C header is sent to an S-GW through a bearer modification process and the S-GW sends the GTP-C header to a P-GW.

The implementation processes of Steps 604-608 are the same as those of steps 404-408.

In step 602, the way to carry the resource information in the GTP-C header may be to carry the resource information in a spare bit of the GTP-C signaling message, for example, the resource information may be filled in the spare bit of the GTP-C signaling message. Table 2 shows a GTP-C header structure involved in the embodiments of the present invention, where the GTP-C header is a GTP-C header of an Evolved Packet Core (abbreviated as EPC).

TABLE 2

GTP-C header structure involved in embodiments of the present invention

| Octets | Bits | | | | | | | |
|---|---|---|---|---|---|---|---|---|
| | 8 | 7 | 6 | 5 | 4 | 3 | 2 | 1 |
| 1 | Version | | | P | T = 1 | Spare | Spare | Spare |
| 2 | Message Type | | | | | | | |
| 3 | Message Length (1st Octet) | | | | | | | |
| 4 | Message Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet) | | | | | | | |
| 10 | Sequence Number (2nd Octet) | | | | | | | |
| 11 | Sequence Number (3rd Octet) | | | | | | | |
| 12 | Spare | | | | | | | |

In step 101 in the first embodiment, the resource information may be sent to the PCRF entity by the eNB in the access network. Specifically, the eNB may encapsulate the resource information in an extension header of a GTP-U data packet and transmit the resource information to the P-GW through a GTP-U tunnel, and the P-GW sends a message that carries the resource information to the PCRF entity.

Figure 8:
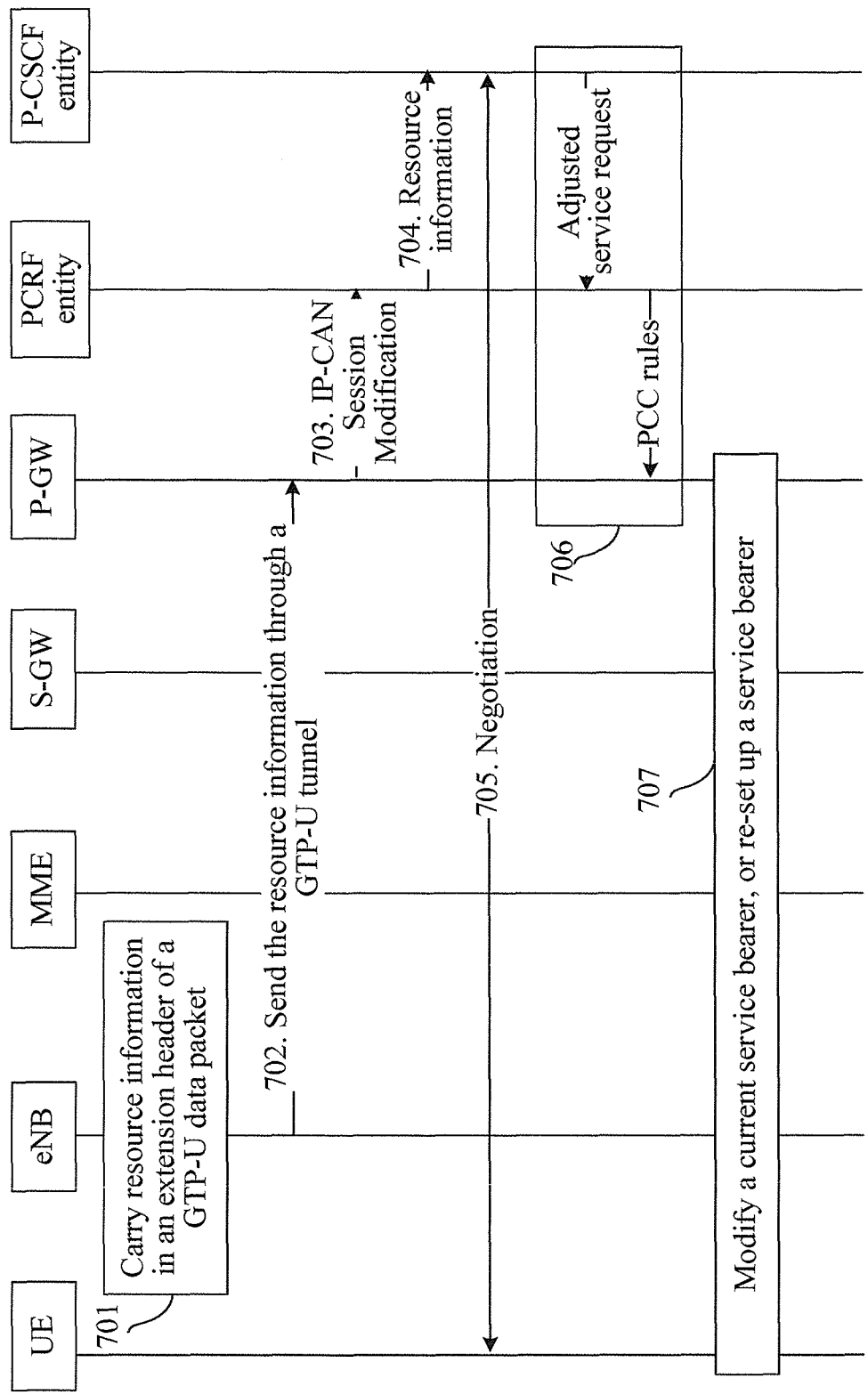
FIG. 8 is a signaling interaction diagram of a method for improving QoS according to a seventh embodiment of the present invention.

FIG. 8 is a signaling interaction diagram of a method for improving QoS according to a seventh embodiment of the present invention, and includes:

Step 701: An eNB encapsulates resource information in an extension header of a GTP-U data packet. Specifically, the eNB may choose a specific bearer and encapsulate the resource information in an extension header of a GTP-U packet related to the specific bearer.

Step 702: The eNB sends the GTP-U extension header that carries the resource information to a P-GW through a GTP-U tunnel. The implementation processes of Steps 703-707 are the same as those of steps 404-408.

Table 3 shows a schematic structure diagram of a GTP-U header involved in embodiments of the present invention.

TABLE 3

Schematic structure diagram of a GTP-U header involved in embodiments of the present invention

| Octets | Bits | | | | | | | |
|---|---|---|---|---|---|---|---|---|
| | 8 | 7 | 6 | 5 | 4 | 3 | 2 | 1 |
| 1 | Version | | | PT | (*) | 1 | S | PN |
| 2 | Message Type | | | | | | | |
| 3 | Length (1st Octet) | | | | | | | |
| 4 | Length (2nd Octet) | | | | | | | |
| 5 | Tunnel Endpoint Identifier (1st Octet) | | | | | | | |
| 6 | Tunnel Endpoint Identifier (2nd Octet) | | | | | | | |
| 7 | Tunnel Endpoint Identifier (3rd Octet) | | | | | | | |
| 8 | Tunnel Endpoint Identifier (4th Octet) | | | | | | | |
| 9 | Sequence Number (1st Octet)1) 4) | | | | | | | |
| 10 | Sequence Number (2nd Octet)1) 4) | | | | | | | |
| 11 | N-PDU (N-PDU Number2) 4)) | | | | | | | |
| 12 | Next Extension Header Type 3) 4) | | | | | | | |

The resource information may be included in the GTP-U extension header shown in Table 3, and in the GTP-U extension header shown in Table 3 octet 12 may extend a next extension header. The next extension header is as shown in Table 4. Table 4 shows a structure of the extension header extended from octet 12 of the GTP-U extension header shown in Table 3. Firstly, an extension header flag in the next extension header is set to be 1. That is, the third bit in octet 1 is set to be 1. Then, the resource information is carried in octet m+1, where m is a natural number.

TABLE 4

Structure of the extension header extended from octet 12 in the GTP-U extension header shown in Table 3

| Octets 1 | Extension Header Length |
|---|---|
| 2-m | Extension Header Content |
| m + 1 | Resource Information |

In step 101 in the first embodiment, the resource information may be sent by the eNB in the access network to the PCRF entity. Specifically, the eNB may encapsulate the resource information in a GPRS Tunneling Protocol for User Plane (abbreviated as GTP-U) message capable of carrying the resource information and sends the GTP-U message capable of carrying the resource information to the P-GW through a GTP-U tunnel sending. The P-GW sends a message that carries the resource information to the PCRF entity. Table 5 shows types of GTP-U messages involved in the embodiment of the present invention.

TABLE 5

GTP-U message types involved in the embodiment of the present invention

| Message Type Value (Decimal) | Message | Reference | GTP-C | GTP-U | GTP' |
|---|---|---|---|---|---|
| 1 | Echo Request | | X | X | x |
| 2 | Echo Response | | X | X | x |
| 3-25 | Reserved in 3GPP TS 32.295 [8] and 3GPP TS 29.060 [6] | | | | |
| 26 | Error Indication | | | X | |
| 27-30 | Reserved in 3GPP TS 29.060 [6] | | | | |
| 31 | Supported Extension Headers Notification | | X | X | |
| 32-252 | Reserved in 3GPP TS 29.060 [6] | | | | |
| 253 | eNB Load Report | | | X | |
| 254 | End Marker | | | X | |
| 255 | G-PDU | | | X | |

In Table 5, the eNB load report message of message type value 253 may be a GTP-U message capable of carrying the resource information. Certainly, the message type value of a newly added GTP-U message capable of carrying the resource information may alternatively be other values and the name of the newly added GTP-U message capable of carrying the resource information may alternatively be other names without being limited to the eNB load report message.

Figure 9:
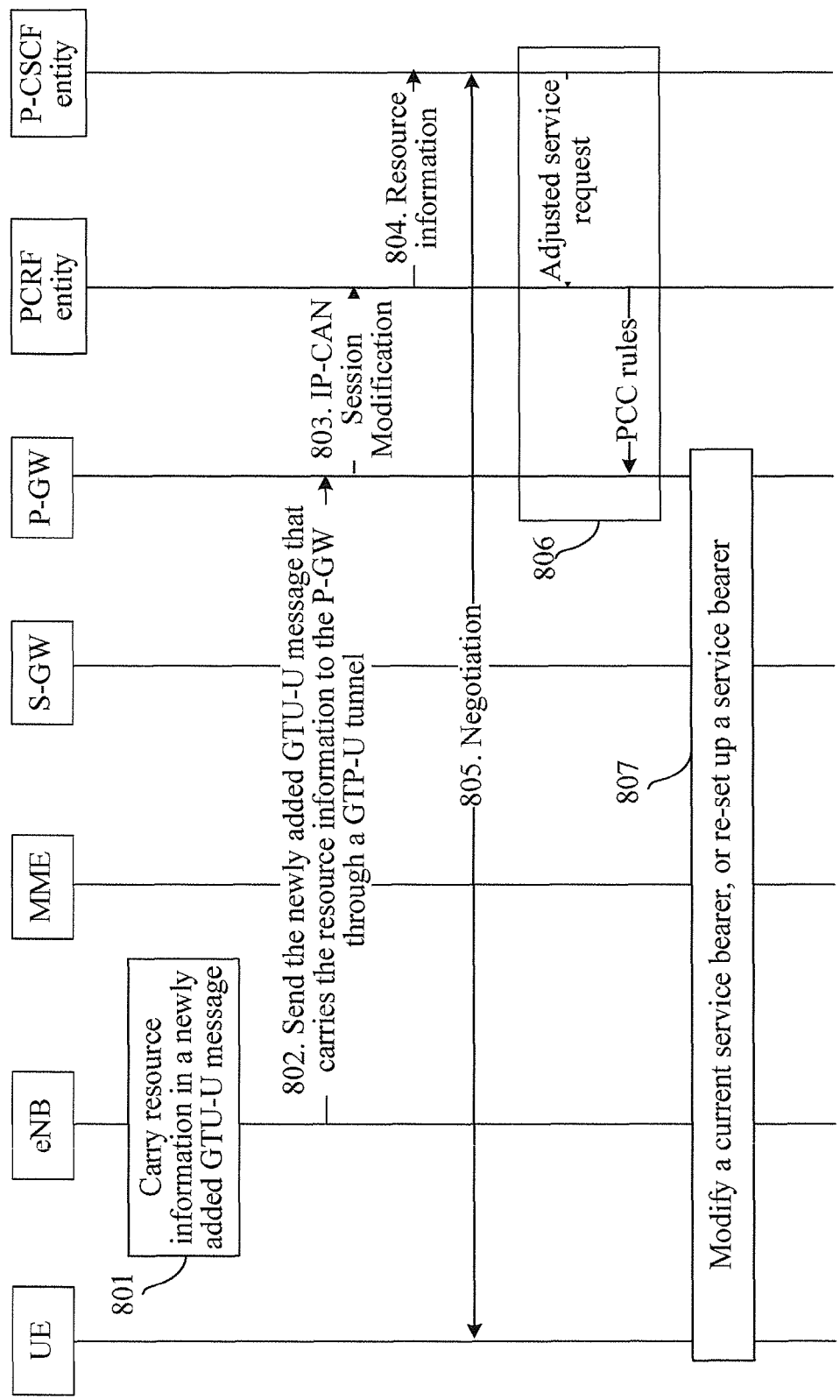
FIG. 9 is a signaling interaction diagram of a method for improving QoS according to an eighth embodiment of the present invention.

FIG. 9 is a signaling interaction diagram of a method for improving QoS according to an eighth embodiment of the present invention, and includes:

Step 801: An eNB carries resource information in a newly added GTP-U message. Specifically, the eNB may choose a specific bearer and encapsulate the resource information in a newly added GTP-U message related to the specific bearer.

Step 802: The eNB sends the newly added GTP-U message that carries the resource information to a P-GW through a GTP-U tunnel.

The implementation processes of Steps 803-807 are the same as those of steps 404-408.

In step 101 in the first embodiment, the resource information may be sent by the eNB in the access network to the PCRF entity. Specifically, the eNB sends an RRC message that carries the resource information to the UE; the UE sends a Request Bearer Resource Modification message that carries the resource information to the P-GW; and the P-GW sends a message that carries the resource information to the PCRF entity.

Figure 10:
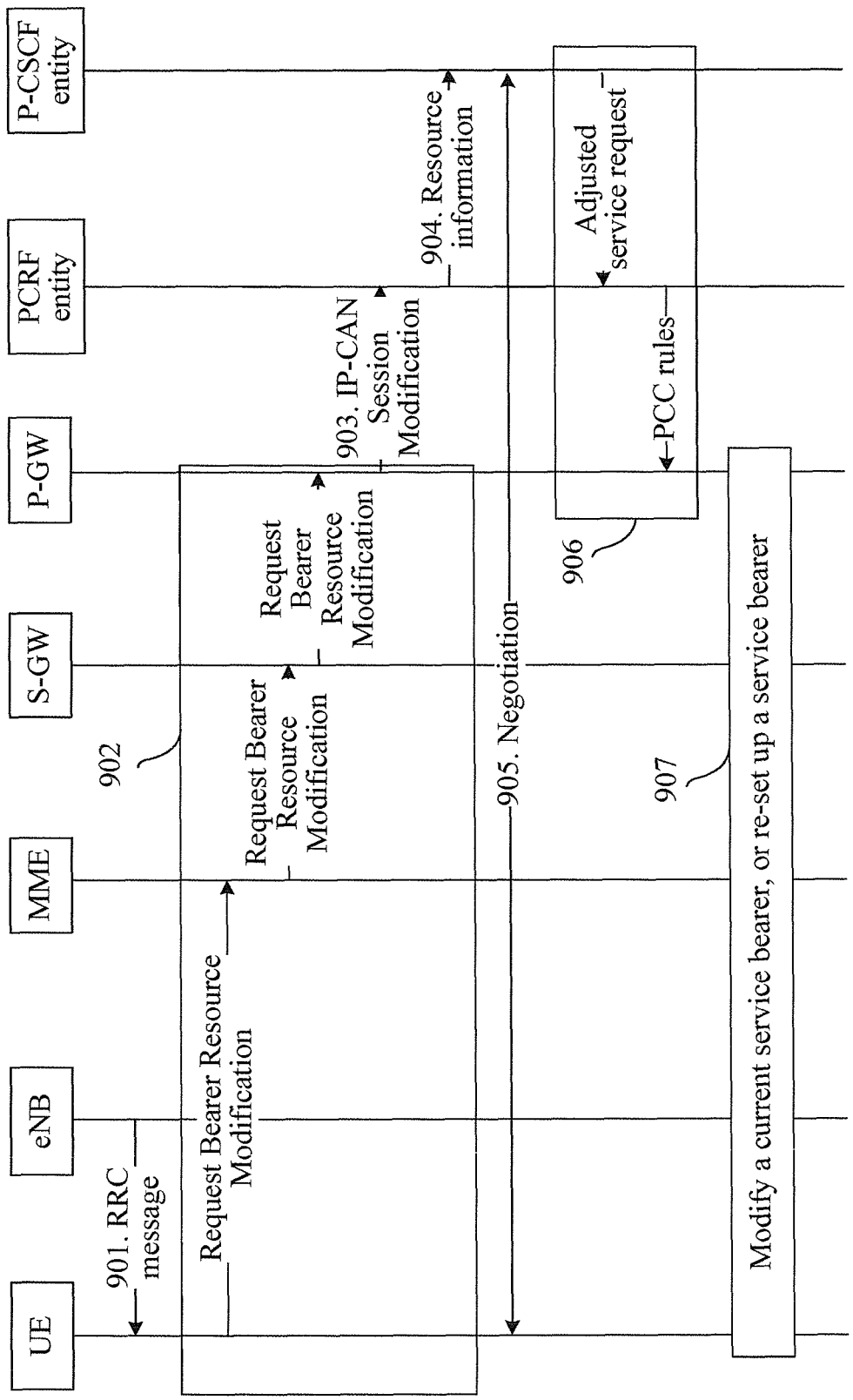
FIG. 10 is a signaling interaction diagram of a method for improving QoS according to a ninth embodiment of the present invention.

FIG. 10 is a signaling interaction diagram of a method for improving QoS according to a ninth embodiment of the present invention, and includes:

Step 901: An eNB sends an RRC message that carries resource information to a UE. Specifically, the eNB may choose a specific bearer and sends an RRC message carrying the resource information and related to the specific bearer to the UE.

Step 902: After receiving the RRC message sent by the eNB, the UE sends a Request Bearer Resource Modification message that carries the resource information to an MME, the MME sends a Request Bearer Resource Modification message that carries to an S-GW, and the S-GW sends a Request Bearer Resource Modification message that carries to a P-GW. After receiving the RRC message from the eNB, the UE may also choose a specific bearer, for example, the UE may choose a bearer guaranteeing Guaranteed Bit Rate (Guaranteed Bit Rate), and sends a Request Bearer Resource Modification message carrying the resource information and related to the chosen bearer to the MME.

Step 903: The P-GW sends an IP-CAN Session Modification message that carries the resource information to a PCRF entity.

The implementation processes of Steps 903-907 are the same as those of steps 404-408.

In the embodiments shown in FIGS. 3 to 10, when the eNB sends the resource information, the eNB may choose a specific bearer and sends the resource information carried in a message related to the specific bearer to the MME, the S-GW, the UE, or the P-GW.

In the embodiments shown in FIGS. 3 and 4, the eNB sends the resource information to the P-CSCF entity without passing through the PCRF entity in the PCC architecture. In the embodiments shown in FIGS. 5, 6, 7, 8, 9 and 10, when the eNB sends resource information to the P-CSCF with passing through the PCRF entity in the PCC architecture.

In the foregoing embodiments of the present invention, the implementation way of the present invention is described by taking that the eNB sends the resource information as an example. The resource information may also be sent by other network element in the access network, for example, the resource information may be sent by a network element in a UTRAN or GERAN, or the resource information may be sent by a network element in a WiMAX network; or the resource information may be sent by other network element (such as the SGW or the PGW).

The specific process is similar to that in the foregoing embodiments. For example, the UTRAN sends an OVERLOAD that carries the resource information to the SGSN; the SGSN sends the resource information to the SGW; the SGW sends the resource information to the P-GW; the P-GW sends the resource information to the PCRF entity; the PCRF entity sends the resource information to the P-CSCF entity; and the P-CSCF entity re-negotiates the service parameter with the UE, or the P-CSCF entity adjusts the service request related to the current service according to the resource information and sends the adjusted service request to the P-GW in the access network.

Furthermore, for example, the SGW sends the resource information to the P-GW; the P-GW sends the resource information to the PCRF entity; the PCRF entity sends the resource information to the P-CSCF entity; and the P-CSCF entity re-negotiates the service parameter with the UE, or the P-CSCF entity adjusts the service request related to the current service according to the resource information and sends the adjusted service request to the P-GW in the access network.

The application network may also be other IP application networks, such as Google servers.

Figure 11:
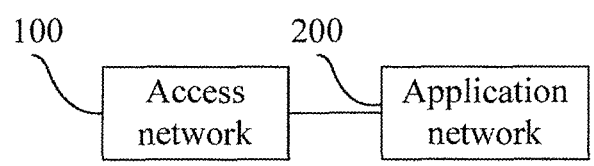
FIG. 11 is a schematic structure diagram of a system for improving QoS according to an embodiment of the present invention.

FIG. 11 is a schematic structure diagram of a system for improving QoS according to an embodiment of the present invention. The system includes an access network 100 and an application network 200. The access network 100 is configured to send resource information when a resource of the access network 100 is changed, where the resource information is information that indicates a current resource status of the access network 100. The application network 200 is configured to receive the resource information, adjust a service request related to the current service according to the resource information, and send the adjusted service request to the access network 100, or negotiate a service parameter related to the current service with a UE according to the resource information, so that the UE modifies the service parameter related to the current service according to a result of the negotiation.

The application network 200 may be an IMS which includes a P-CSCF entity; and the access network 100 includes an eNB, where the eNB is configured to send the resource information to the P-CSCF entity. Specifically, the eNB may be configured to send the resource information to the P-CSCF entity through the UE.

The system shown in FIG. 11 may further include a PCRF entity which is connected respectively to the application network 200 and the access network 100; the application network is an INS, in which the IMS includes a P-CSCF entity and the access network includes an eNB. The eNB may be specifically configured to send the resource information to the PCRF entity; and the PCRF entity is specifically configured to send the resource information to the P-CSCF entity.

The PCRF entity may be further configured to generate PCC rules according to the service request sent by the P-CSCF entity and send the PCC rules to a P-GW in the access network.

Figure 12:
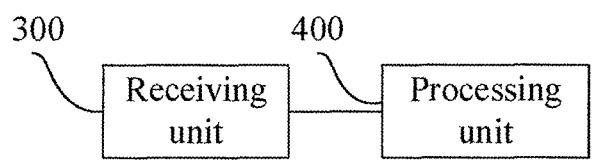
FIG. 12 is a schematic structure diagram of an application network element according to an embodiment of the present invention.

FIG. 12 is a schematic structure diagram of an application network element according to an embodiment of the present invention. The network element includes a receiving unit 300 and a processing unit 400, where the receiving unit 300 is connected to the processing unit 400. The receiving unit 300 is configured to receive resource information sent by an access network; the processing unit 400 is connected to the receiving unit 300 and is configured to adjust a service request related to a current service according to the resource information received by the receiving unit 300 and send the adjusted service request to the access network; or configured to negotiate with a UE over a service parameter related to the current service according to the resource information received by the receiving unit 300, so that the UE modifies the service parameter related to the current service according to a result of the negotiation.

Persons of ordinary skill in the art should understand that all or part of the steps in the methods of the embodiments can be implemented by hardware under the instruction of a program. The program may be stored in a computer readable storage medium and when the program runs, the steps in the methods of the embodiments are performed. The storage medium may be any medium that can store program codes, such as a ROM, a RAM, a magnetic disk, or Compact Disk-Read Only Memory.

Finally, it should be noted that the embodiments are merely provided for describing the technical solutions of the present invention, but not intended to limit the present invention. Although the present invention has been described in details with reference to exemplary embodiments, it should be understood by persons of ordinary skill in the art that modifications or equivalent replacements can be made to the technical solutions of the present invention, and such modifications or equivalent replacements do not cause the modified technical solutions to depart from the spirit and scope of the present invention.

What is claimed is:

1. A method for improving Quality of Service, the method comprising:

when a resource of an access network is changed, receiving, by an application network, resource information sent by the access network, wherein the resource information indicates a current resource status of the access network;

adjusting, by the application network, a service request related to a current service according to the resource information and sending the adjusted service request to the access network; or negotiating, by the application network, a service parameter related to a current service with a User Equipment (UE) according to the resource information, so that the UE modifies the service parameter related to the current service according to a result of the negotiation;

wherein the application network is an IP Multimedia Subsystem (IMS); and receiving, by the application network, the resource information sent by the access network comprises: receiving, by a Proxy-Call Session Control Function (P-CSCF) entity in the IMS, the resource information sent by a Policy and Charging Rules Function (PCRF) entity.

2. The method according to claim 1, wherein adjusting, by the application network, the service request related to the current service according to the resource information comprises:

negotiating, by the application network, a service parameter related to the current service with the UE according to the resource information and adjusting the service request related to the current service.

3. The method according to claim 1, further comprising:

sending, by an eNB, a message that carries the resource information to an Mobility Management Entity (MME); sending, by the MME, the resource information to a Packet Data Network Gateway (P-GW); and sending, by the P-GW, an IP-CAN message that carries the resource information to the PCRF entity; or sending, by an eNB, an RRC message that carries the resource information to the UE; sending, by the UE, a Request Bearer Resource Modification message that carries the resource information to a P-GW; and sending, by the P-GW, an IP-CAN message that carries the resource information to the PCRF entity; or encapsulating, by an eNB, the resource information in an extension header of a GPRS Tunnelling Protocol for User Plane (GTP-U) data packet and transmitting the resource information to a P-GW through a GTP-U tunnel; and sending, by the P-GW, an IP-CAN message that carries the resource information to the PCRF entity; or encapsulating, by an eNB, the resource information in a GTP-U message capable of carrying the resource information and sending the GTP-U message that carries the resource information to a P-GW through a GTP-U tunnel; and sending, by the P-GW, an IP-CAN message that carries the resource information to the PCRF entity.

4. The method according to claim 3, wherein:

sending, by the eNB, the message that carries the resource information to the MME comprises: choosing, by the eNB, a specific bearer, and sending the message carrying the resource information and related to the specific bearer to the MME;

sending, by the eNB, the RRC message that carries the resource information to the UE comprises: choosing, by the eNB, a specific bearer and sending the RRC message carrying the resource information and related to the specific bearer to the UE;

encapsulating, by the eNB, the resource information in the extension header of the GTP-U data packet comprises: choosing, by the eNB, a specific bearer and encapsulating the resource information in the extension header of the GTP-U data packet related to the specific bearer;

encapsulating, by the eNB, the resource information in the GTP-U message capable of carrying the resource information comprises: choosing, by the eNB, a specific bearer and encapsulating the resource information in the GPT-U message related to the specific bearer and capable of carrying the resource information; and wherein the specific bearer is a Guaranteed Bit Rate bearer or a bearer with a QoS Class Identifier not in the resource information.

5. The method according to claim 3, wherein sending, by the MME, the resource information to the P-GW comprises:

sending, by the MME, a message that carries the resource information to an S-GW; and sending, by the S-GW, a message that carries the resource information to the P-GW; or sending, by the MME, a message that carries the resource information to the UE; sending, by the UE, a Request Bearer Resource Modification message that carries the resource information to the MME; sending, by the MME, a Request Bearer Resource Modification message that carries the resource information to an S-GW; and sending, by the S-GW, a Request Bearer Resource Modification message that carries the resource information to the P-GW; or encapsulating, by the MME, the resource information in a GTP-C header and sending the GTP-C header to an S-GW through a bearer modification process; and sending, by the S-GW, the GTP-C header to the P-GW.

6. The method according to claim 3, wherein sending, by the P-GW, the IP-CAN message that carries the resource information to the PCRF entity comprises: sending, by the P-GW, an IP-CAN Session Modification message or an IP-CAN Session Notification message that carries the resource information to the PCRF entity.

7. The method according to claim 1, wherein sending, by the PCRF entity, the resource information to the P-CSCF entity in the IMS comprises: sending, by the PCRF entity, an information element that carries the resource information and is defined by Diameter protocol to the P-CSCF entity.

8. The method according to claim 7, wherein sending the adjusted service request to the access network comprises:

sending, by the P-CSCF entity in the IMS, an information element that carries the resource information and is defined by Diameter protocol to the PCRF entity; and generating, by the PCRF entity, Policy and Charging Control (PCC) rules according to the adjusted service request and sending the PCC rules to the P-GW in the access network.

9. The method according to claim 7, wherein sending the adjusted service request to the access network comprises: sending, by the P-CSCF entity in the IMS, the adjusted service request to the P-GW in the access network.

10. The method according to claim 1, wherein the resource information is received by the PCRF entity from an evolved NodeB (eNB) in the access network.

11. A system for improving Quality of Service, comprising:

an access network, configured to send resource information when a resource of the access network is changed, wherein the resource information indicates a current resource status of the access network;

an application network, configured to receive the resource information, adjust a service request related to a current service according to the resource information, and send the adjusted service request to the access network; or negotiate a service parameter related to a current service with a User Equipment (UE) according to the resource information, so that the UE modifies the service parameter related to the current service according to a result of the negotiation; and a Policy and Charging Rules Function (PCRF) entity connected to the application network and the access network respectively, wherein the application network is an IP Multimedia Subsystem (IMS), wherein:
 the IMS comprises a P-CSCF entity and the access network comprises an eNB, and
 the P-CSCF entity is configured to receive the resource information from the PCRF entity.

12. The system according to claim 11, wherein the PCRF entity is further configured to generate Policy and Charging Control (PCC) rules according to the service request sent by the P-CSCF entity and send the PCC rules to a Packet Data Network Gateway (P-GW) in the access network.

13. The application network element according to claim 11, wherein the resource information is received by the PCRF entity from an evolved NodeB (eNB) in the access network.

14. An application network element, comprising:
 a receiving unit, configured to receive resource information sent by an access network, wherein the resource information indicates a current resource status of the access network;
 a processing unit, connected to the receiving unit and configured to adjust a service request related to a current service according to the resource information received by the receiving unit and send the adjusted service request to the access network; or negotiate a service parameter related to a current service with a User Equipment (UE) according to the resource information received by the receiving unit, so that the UE modifies the service parameter related to the current service according to a result of the negotiation; and
 wherein the receiving unit is configured to receive the resource information sent by a Policy and Charging Rules Function (PCRF) entity.

15. The system according to claim 14, wherein the PCRF entity is further configured to receive the resource information from the eNB.

\* \* \* \* \*